United States Patent [19]

Psaar et al.

[11] 4,143,228
[45] Mar. 6, 1979

[54] PYRAZOLINYL INDOLIUM DYESTUFFS

[75] Inventors: Hubertus Psaar; Winfried Kruckenberg, both of Leverkusen, Germany

[73] Assignee: Bayer Aktiengesellschaft, Leverkusen, Fed. Rep. of Germany

[21] Appl. No.: 826,999

[22] Filed: Aug. 23, 1977

[30] Foreign Application Priority Data

Aug. 25, 1976 [DE] Fed. Rep. of Germany ....... 2638232

[51] Int. Cl.² .......................................... C07D 403/04
[52] U.S. Cl. ............................. 548/379; 8/177 AB;
260/163; 260/326.11 R; 260/326.15;
260/326.16; 542/413; 542/426; 542/427;
542/429; 542/455; 542/468; 548/369
[58] Field of Search .............................. 548/369, 379

[56] References Cited
U.S. PATENT DOCUMENTS

| | | | |
|---|---|---|---|
| 2,974,141 | 3/1961 | Plue | 548/379 |
| 3,073,820 | 1/1963 | Plue | 548/379 |
| 3,770,727 | 11/1973 | Brack | 548/379 |

FOREIGN PATENT DOCUMENTS 2,036,505  1/1972 Fed. Rep. of Germany ........... 548/379

OTHER PUBLICATIONS

Piozzo et al., Chem. Absts. 1967, vol. 67, No. 64295r.
Tsukerman et al., Chem. Absts. 1969, vol. 71, No. 22060r.
Gorbunova et al., Chem. Absts. 1971, vol. 74, No. 53631r.
Zhungietu et al., Chem. Absts. 1973, vol. 78, No. 111271u.

*Primary Examiner*—Natalie Trousof
*Assistant Examiner*—Natalia Harkaway
*Attorney, Agent, or Firm*—Plumley and Tyner

[57] ABSTRACT

Dyestuffs of the formula wherein
$R_1$ denotes halogen, alkyl, cycloalkyl, aralkyl, nitro, cyano, acyl, acylamino, amino, aminocarbonyl, aminosulphonyl, arylsulphonyl, alkylsulphonyl, alkoxy, aryloxy, aralkoxy, carboxyl, alkoxycarbonyl, aryloxycarbonyl or aralkoxycarbonyl or arylazo,
$R_2$ denotes alkyl, alkenyl, cycloalkyl, aryl or aralkyl,
$R_3$ denotes alkyl, cycloalkyl or aralkyl,
$R_4$ denotes alkyl, cycloalkyl or aralkyl,
$R_5$, $R_6$, $R_7$ and $R_8$ denote hydrogen, alkyl, cycloalkyl, aralkyl or aryl and $R_6$ and $R_7$ conjointly can form a fused cycloaliphatic ring,
$R_9$ denotes chlorine, bromine, nitro, cyano, $C_1$-$C_4$-alkyl, phenyl, benzyl, $C_1$-$C_4$-alkoxy, phenoxy, benzyloxy, $C_1$-$C_4$-alkoxycarbonyl, phenoxycarbonyl, benzyloxycarbonyl, carboxyl, $C_1$-$C_4$-alkylsulphonyl, phenylsulphonyl, benzylsulphonyl, $C_1$-$C_4$-alkoxysulphonyl, phenoxysulphonyl, benzyloxysulphonyl, aminocarbonyl, mono- or di- $C_1$-$C_4$-alkylaminocarbonyl, aminosulphonyl, mono- di- $C_1$-$C_4$-alkylamino-sulphonyl, $C_1$-$C_3$-alkylcarbonyl, $C_1$-$C_3$-alkylcarbonylamino, benzoylamino, phenylamino, mono- or di- $C_1$-$C_4$-alkylamino, benzylamino or phenylazo,
$n$ denotes 0, 1 or 2,
$m$ denotes 0, 1, 2 or 3 and
and wherein
at least one of the radicals $R_1$, $R_2$ or $R_9$ denotes a radical of the formula
—A—O—(B—O)$_p$—E
—A—O—CO—F—O—(B—O)$_p$—E or
—A—(O—F)$_q$—CO—O—(B—O)$_p$—E
or is substituted by such a radical,
wherein
A represents an alkylene or alkenylene radical or a direct bond,
B represents an alkylene or alkenylene radical,
E represents an alkyl, alkenyl, cycloalkyl, formyl, alkylcarbonyl, alkenylcarbonyl or cycloalkylcarbonyl radical, a phenylcarbonyl, phenylalkylcarbonyl, phenoxyalkylcarbonyl or phenylalkyl radical or hydrogen,
F represents an optionally substituted alkylene radical,
$p$ represents 1 to 5 and
$q$ represents 0 or 1.

5 Claims, No Drawings

PYRAZOLINYL INDOLIUM DYESTUFFS

The invention relates to dyestuffs of the general formula

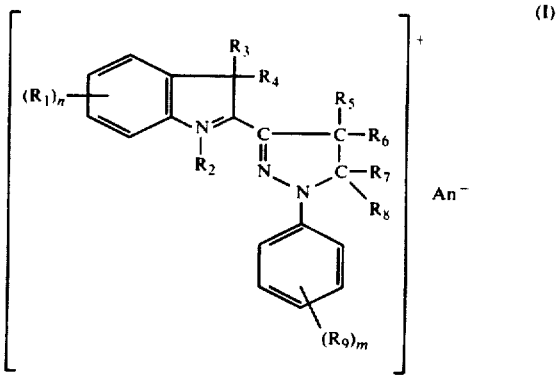

wherein $R_1$ denotes halogen, alkyl, cycloalkyl, aralkyl, nitro, cyano, acyl, acylamino, amino, aminocarbonyl, aminosulphonyl, arylsulphonyl, alkylsulphonyl, alkoxy, aryloxy, aralkoxy, carboxyl, alkoxycarbonyl, aryloxycarbonyl or aralkoxycarbonyl or arylazo, $R_2$ denotes alkyl, alkenyl, cycloalkyl, aryl or aralkyl, $R_3$ denotes alkyl, cycloalkyl or aralkyl, $R_4$ denotes alkyl, cycloalkyl or aralkyl, $R_5$, $R_6$, $R_7$ and $R_8$ denote hydrogen, alkyl, cycloalkyl, aralkyl or aryl and $R_6$ and $R_7$ conjointly can form a fused cycloaliphatic ring, $R_9$ denotes chlorine, bromine, nitro, cyano, $C_1$-$C_4$-alkyl, phenyl, benzyl, $C_1$-$C_4$-alkoxy, phenoxy, benzyloxy, $C_1$-$C_4$-alkoxycarbonyl, phenoxycarbonyl, benzyloxycarbonyl, carboxyl, $C_1$-$C_4$-alkylsulphonyl, phenylsulphonyl, benzylsulphonyl, $C_1$-$C_4$-alkoxysulphonyl, phenoxysulphonyl, benzyloxysulphonyl, aminocarbonyl, mono- or di- $C_1$-$C_4$-alkylaminocarbonyl, aminosulphonyl, mono- or di- $C_1$-$C_4$-alkylamino-sulphonyl, $C_1$-$C_3$-alkylcarbonyl, $C_1$-$C_3$-alkylcarbonylamino, benzoylamino, phenylamino, mono- or di-$C_1$-$C_4$-alkylamino, benzylamino or phenylazo, $n$ denotes 0, 1 or 2, $m$ denotes 0, 1, 2 or 3 and An$^-$ denotes an anion and wherein at least one of the radicals $R_1$, $R_2$ or $R_9$ denotes a radical of the formula $$-A-O-(B-O)_p-E \quad (II)$$

$$-A-O-CO-F-O-(B-O)_p-E \quad (III) \text{ or}$$

$$-A-(O-F)_q-CO-O-(B-O)_p-E \quad (IV)$$

or is substituted by such a radical, wherein

A represents an alkylene or alkenylene radical or a direct bond,

B represents an alkylene or alkenylene radical,

E represents an alkyl, alkenyl, cycloalkyl, formyl, alkylcarbonyl, alkenylcarbonyl or cycloalkylcarbonyl radical, a phenylcarbonyl, phenylalkylcarbonyl, phenoxyalkylcarbonyl or phenylalkyl radical or hydrogen, F represents an optionally substituted alkylene radical, $p$ represents 1 to 5 and $q$ represents 0 or 1 and wherein the alkyl, alkenyl, cycloalkyl, aryl, phenyl and alkylene radicals can be substituted by nonionic substituents and/or a carboxyl group, and to a process for their preparation and their use for dyeing and printing synthetic fibre materials which can be dyed with base dyestuffs.

The abovementioned alkyl and alkylene radicals preferably contain 1 to 6 C atoms and the alkenyl and alkenylene radicals contain 2 to 6 C atoms and can be straight-chain or branched. They can be substituted by a carboxyl group and/or by 1 - 3 nonionic substituents, such as halogen atoms or hydroxyl, $C_1$-$C_4$-alkoxy, cyano, $C_1$-$C_4$-alkoxycarbonyl or carboxamide groups. Examples which may be mentioned are: 2-chloroethyl, 2-bromoethyl, 2-hydroxyethyl, 2-methoxyethyl, 2-cyanoethyl, 2-acetoxyethyl, 2-carboxamidoethyl, 2-carboxyethyl, 2-methoxycarbonylethyl, 2-ethoxycarbonylethyl, 2-hydroxypropyl-(1), 3-cyanopropyl, 2-hydroxy-n-propyl, 2-hydroxy-n-butyl, 2-hydroxy-i-butyl, 2-hydroxy-3-allyloxy-n-propyl, 3-methoxycarbonyl-n-butyl and 2-chloroallyl.

Cycloalkyl in particular represents cyclopentyl and cyclohexyl, which can be substituted by 1 - 3 nonionic substituents, such as halogen or $C_1$-$C_6$-alkyl groups, such as 4-chlorocyclohexyl and dimethyl-cyclohexyl. Aralkyl above all represents benzyl, 2-phenylethyl or phenylpropyl-2 and represents phenyl and naphthyl, in which the aromatic rings can be substituted by a carboxyl group and/or 1-3 nonionic radicals, such as halogen, cyano, nitro, $C_1$-$C_6$-alkyl or $C_1$-$C_4$-alkoxy, for example 4-chloro-, 4-methyl-, 4-methoxy- or 4-nitrophenyl.

Halogen is understood as, preferably, fluorine, chlorine or bromine.

Suitable acyl groups are, for example, $C_1$-$C_3$-alkylcarbonyl and -sulphonyl, benzoyl and phenylsulphonyl radicals.

$R_6$ and $R_7$, together with the two carbon atoms to which they are bonded, preferably form a cyclohexane ring.

Possible anionic radicals An$^-$ are the organic and inorganic anions customary for cationic dyestuffs. Colourless anions are preferred.

Examples of inorganic anions are fluoride, chloride, bromide and iodide, perchlorate, hydroxyl, hydrogen sulphate, sulphate, disulphate, nitrate, dihydrogen phosphate, hydrogen phosphate, phosphate, metaphosphate, carbonate, methosulphate, ethosulphate, cyanate, thiocyanate, borate and tetrafluoborate, as well as anions of esters of boric acid, such as of the glycerol ester of boric acid, and of esters of phosphoric acid, such as of methyl phosphate.

Organic anions are, for example, anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, propionic acid, butyric acid, dichloroacetic acid, trichloroacetic acid, trifluoroacetic acid, 2- and 3-chloropropionic acid, 3-hydroxypropionic acid, O-ethylglycolic acid, thioglycolic acid, glyceric acid, dodecyltetraethylene glycol ether-propionic acid, thioacetic acid, phenoxyacetic acid and n-valeric acid and of acrylic acid, methacrylic acid, crotonic acid, propargylic acid, oxalic acid, malonic acid, succinic acid, glutaric acid, adipic acid, tartaric acid, citric acid, glyoxylic acid, fumaric acid, maleic acid, itaconic acid, methanesulphonic acid, ethanesulphonic acid, chloromethanesulphonic acid, 2-chloroethanesulphonic acid and 2-hydroxyethanesulphonic acid.

Suitable anions of cycloaliphatic carboxylic acids are, for example, the anions of cyclohexanecarboxylic acid and cyclohexene-3-carboxylic acid and anions of araliphatic monocarboxylic acids are, for example, anions of phenylacetic acid and mandelic acid.

Suitable anions of aromatic carboxylic acids are, for example, the anions of benzoic acid, the various isomers, monoand di-methyl-, chloro-, hydroxy-, amino- and methoxy-benzoic acids and of phthalic acid, 4-hydroxyphthalic acid, 4-methoxyphthalic acid, isophthalic acid and 3-sulphobenzoic acid.

Suitable anions of heterocyclic carboxylic acids are, for example, the anions of furoic acid, dehydromucic acid and 3-indolyl-acetic acid.

Suitable anions of aromatic sulphonic acids are, for example, the anions of benzenesulphonic acid, benzene-1,3-disulphonic acid, 4-chlorobenzenesulphonic acid, 3-nitrobenzenesulphonic acid, toluene-2-sulphonic acid and toluene-ω-sulphonic acid.

Further possible anions are the anions of lower alkyland benzene-sulphonic, -phosphonic and -phosphonous acids, such as benzenesulphinic acid and methyl- and benzene-phosphonic acids.

The anion is generally determined by the process of preparation and any purification of the crude dyestuff which may be carried out. In general, the dyestuffs are in the form of halides, especially chlorides or bromides, sulphates, nitrates, methosulphates, ethosulphates, methanesulphonates, ethanesulphates, phosphates, acetates, benzenesulphonates or toluenesulphonates. The anions can be replaced by other anions in a known manner.

Preferred substituents of the alkyl radicals mentioned under E are $C_1$-$C_4$-alkoxycarbonyl, $C_1$-$C_4$-alkoxy, halogen or cyano.

Hydroxyl or chlorine may be mentioned as preferred substituents of the alkyl radicals mentioned under A, B and F. Preferred radicals (II)-(IV) are those of the formulae

     (IIa)

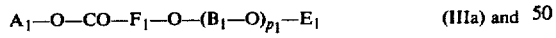     (IIIa) and

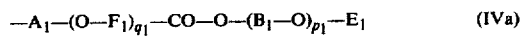     (IVa)

wherein $A_1$ represents a direct bond or a $C_2$-$C_4$alkylene radical, $B_1$ represents a $C_2$-$C_4$-alkylene radical, $E_1$ represents a $C_1$-$C_4$-alkyl or $C_2$-$C_4$-alkenyl radical which is optionally substituted by halogen or cyano or represents a $C_1$-$C_4$-alkylcarbonyl or $C_2$-$C_4$-alkenylcarbonyl radical which is optionally substituted by halogen, cyano or $C_1$-$C_4$-alkoxy or represents a formyl radical, $F_1$ represents a $C_1$- or $C_2$-alkylene radical, $p_1$ represents 2 or 3 and $q_1$ represents 0 or 1.

Amongst these radicals, in turn, those in which $A_1$ represents $C_2H_4$ or a direct bond, $B_1$ represents $C_2H_4$ and E represents a $C_1$-$C_4$-alkyl, $C_2$-$C_4$-alkenyl, $C_1$-$C_4$-alkylcarbonyl, formyl or $C_2$-$C_4$-alkenylcarbonyl radical are preferred. Amongst the latter, those which represent type IVa and wherein $E_1$ denotes a $C_1$-$C_4$-alkyl radical, $A_1$ denotes a direct bond and $p_1$ denotes 0, are preferred.

Preferred dyestuffs are those of the general formula

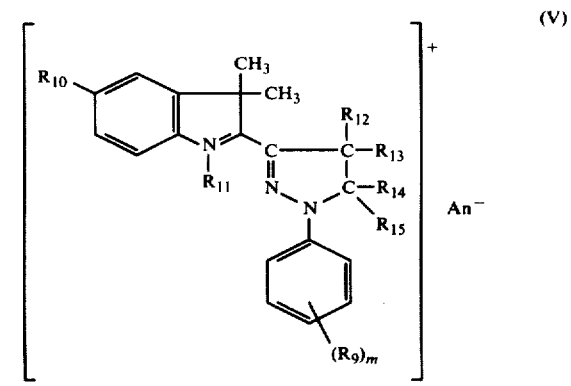

(V)

wherein $R_{10}$ denotes hydrogen, $C_1$-$C_4$-alkyl, trifluoromethyl, chlorine, bromine, nitro, cyano, $C_1C_4$-alkoxy, $C_1$-$C_4$-alkoxycarbonyl, methyl-, ethyl- or phenyl-carbonylamino, amino-carbonyl or -sulphonyl, $C_1$-$C_4$-alkyl- or phenyl-sulphonyl or phenylazo, $R_{11}$ denotes $C_1$-$C_4$-alkyl which can be substituted by hydroxyl, chlorine, cyano or aminocarbonyl or denotes phenyl or benzyl, $R_{12}$ and $R_{13}$ denote hydrogen or $C_1$-$C_4$-alkyl, $R_{14}$ and $R_{15}$ denote hydrogen, $C_1$-$C_4$-alkyl or phenyl and $R_9$, m and $An^-$ possess the abovementioned meaning and wherein at least one radical $R_9$ represents a substituent of the formulae (IIa), (IIIa) or (IVa).

Another embodiment of the invention is represented by dyestuffs of the formula

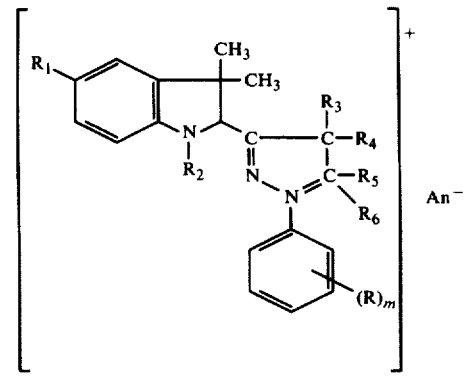

R is chlorine, bromine, nitro, cyano, $C_1$-$C_4$-alkyl, $C_1$-$C_4$-alkoxy, $C_1$-$C_4$-alkoxycarbonyl, $C_1$-$C_4$-alkylsulphonyl, phenylsulphonyl, aminocarbonyl, or aminosulphonyl;

$R_1$ is hydrogen, $C_1$-$C_4$-alkyl, trifluoromethyl, chlorine, bromine, nitro, cyano, $C_1$-$C_4$-alkoxy, $C_1$-$C_4$-alkoxycarbonyl, methylcarbonylamino, ethylcarbonylamino, phenylcarbonylamino, aminocarbonyl, aminosulphonyl, $C_1$-$C_4$-alkylsulphonyl, or phenylsulphonyl;

$R_2$ is phenyl, benzyl, $C_1$-$C_4$-alkyl, or $C_1$-$C_4$-alkyl substituted by hydroxyl, chlorine, cyano, or aminocarbonyl;

$R_3$ and $R_4$ are hydrogen or $C_1$-$C_4$-alkyl;

$R_5$ and $R_6$ are hydrogen, $C_1$-$C_4$-alkyl or phenyl;

$m$ is 0, 1, 2 or 3;

$An^-$ is an anion; and additionally at least one radical R must be a substituent of the formulae $$-O-(B_1-O)_{p_1}-E_1;$$

$$-O-CO-F_1-O-(B_1-O)_{p_1}-E_1; \text{ or}$$

$$-(O-F_1)_{q_1}-CO-O-(B_1-O)_{p_1}-E_1$$

wherein $B_1$ is $C_2$-$C_4$-alkylene;

$E_1$ is hydrogen, $C_1$-$C_4$-alkyl, $C_2$-$C_4$-alkenyl, halo-$C_1$-$C_4$-alkyl, halo-$C_2$-$C_4$-alkenyl, cyano-$C_1$-$C_4$-alkyl, cyano-$C_2$-$C_4$-alkenyl, formyl, phenylcarbonyl, phenyl-$C_1$-$C_6$-alkylcarbonyl, phenoxy-$C_1$-$C_6$-alkylcarbonyl, phenyl-$C_1$-$C_6$-alkyl, $C_1$-$C_4$-alkylcarbonyl, halo-$C_1$-$C_4$-alkylcarbonyl, cyano-$C_1$-$C_4$-alkylcarbonyl, $C_1$-$C_4$-alkoxy-$C_1$-$C_4$-alkylcarbonyl, $C_2$-$C_4$-alkenylcarbonyl, halo-$C_1$-$C_4$-alkenylcarbonyl, cyano-$C_2$-$C_4$-alkenylcarbonyl, or $C_1$-$C_4$-alkoxy-$C_2$-$C_4$-alkenylcarbonyl;

$F_1$ is $C_1$- or $C_2$-alkylene;

$p_1$ is 2 or 3; and $q$ is 0 or 1.

Particularly preferred dyestuffs are those of the general formula

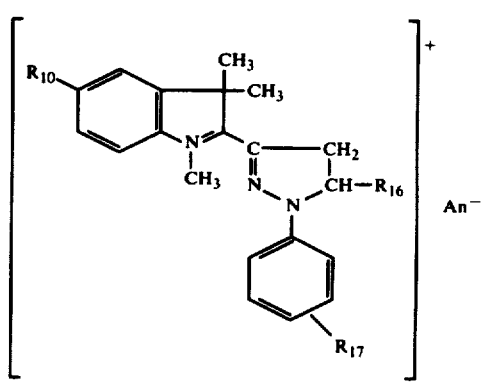
(VI)

wherein $R_{16}$ denotes hydrogen or $C_1$-$C_4$-alkyl and $R_{10}$ and $An^-$ possess the abovementioned meaning and wherein $R_{17}$ corresponds to a radical of the formula IIa, IIIa or IVa.

Amongst these dyestuffs, in turn, those of the formula

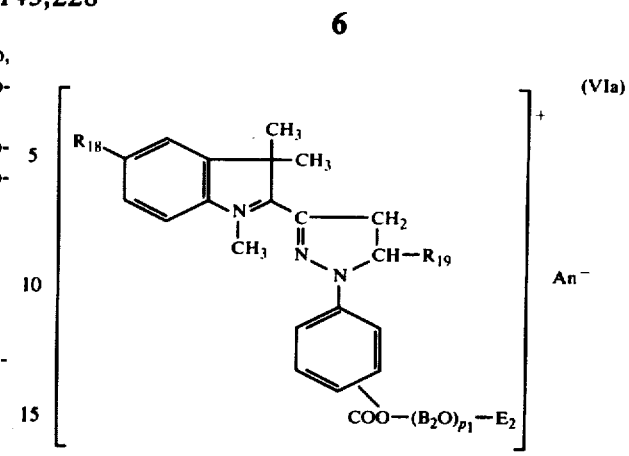

wherein $R_{18}$ denotes hydrogen, methyl, nitro, cyano, methoxy, ethoxy, methoxycarbonyl or ethoxycarbonyl or acetylamino, $R_{19}$ denotes hydrogen, methyl or ethyl, $B_2$ denotes ethylene, $E_2$ denotes methyl or ethyl, $p_1$ denotes 2 or 3 and $An^-$ denotes an anion, are to be mentioned in particular.

The dyestuffs (I) can be prepared by subjecting compounds of the formula

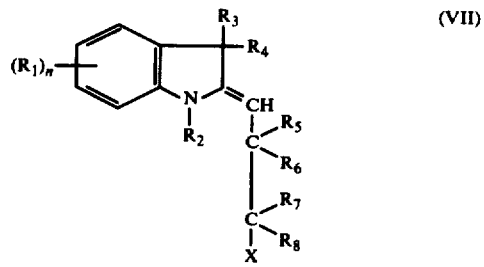
(VII)

wherein $n$ and $R_1$ to $R_8$ have the meaning indicated above and X denotes hydroxyl or a group which can be split off as an anion $An^-$ under the conditions of the coupling reaction, to a coupling reaction with a diazonium compound of an amine of the formula

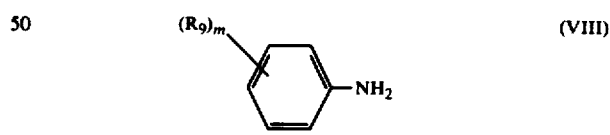
(VIII)

wherein $R_9$ and $m$ have the abovementioned meaning, with the proviso that at least one of the radicals $R_1$, $R_2$ or $R_9$ represents a radical of the formulae (II), (III) or (IV), and if necessary — when a compound in which X = OH is used as the starting material — subsequently effecting cyclisation in the presence of a condensing agent.

X preferably represents a hydroxyl, mercapto, halogen, $C_1$-$C_4$-alkoxy, $C_1$-$C_4$-alkylmercapto, formyloxy or acetoxy group, a carbonic acid group esterified by methanol or ethanol, a sulphuric acid group or phosphoric acid group optionally esterified by methanol or ethanol, a $C_1$-$C_4$-alkylsulphonic acid group or a benzenesulphonic acid group optionally substituted by $C_1$-$C_4$-alkyl.

The coupling reaction can be carried in aqueous solution with or without the addition of organic, water-miscible solvents, in a neutral medium or with the addition of alkalis, such as sodium acetate, at, preferably, 0°–50° C.

Examples of suitable organic solvents are methanol, ethanol, propanol, isopropanol, acetone, acetonitrile, dimethylformamide, pyridine, picoline, quinoline or quinaldine.

Suitable condensing agents are acids, acid halides, acid anhydrides or acid esters, such as sulphuric acid, phosphoric acid, hydrochloric acid, chlorosulphonic acid, phosphorus oxychloride, phosphorus oxybromide, thionyl chloride, dimethyl sulfphate, acetyl chloride or acetic anhydride.

Cyclisation can be carried out, for example, at 20°–100° C. and the condensing agent can at the same time serve as the solvent, or a further solvent, such as benzene, toluene, xylene, chlorobenzene, dichlorobenzene, ethylene chloride or chloroform, can be added.

A further route for the preparation of the pyrazoline dyestuffs (I) is the reaction of the compounds of the formula

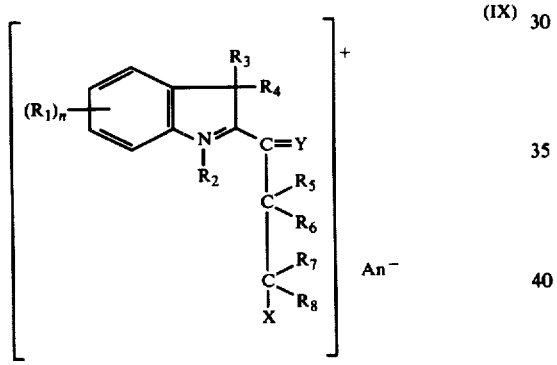

wherein $R_1$ to $R_8$, $n$ and X possess the abovementioned meaning and

Y denotes O or a customary derivative of a ketone, such as, for example, N-OH or N-NH$_2$, with hydrazines of the formula

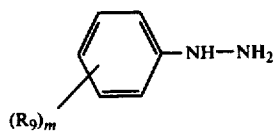

wherein $R_9$ and $m$ have the abovementioned meaning, with the proviso that at least one of the radicals $R_1$, $R_2$ or $R_9$ represents a radical of the formulae (II), (III) or (IV).

The invention also relates to compounds of the formula (VII), their preparation and their use for the preparation of the dyestuffs (I).

Preferred substituents of the formula (VII) are indicated in the formulae (V) and (VI).

Compounds of the formula (VII) wherein X represents a hydroxyl group can be present in the tautomeric formulae

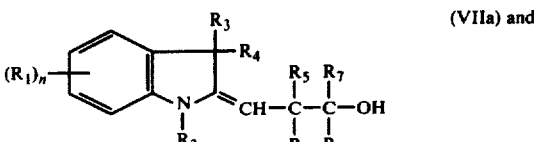

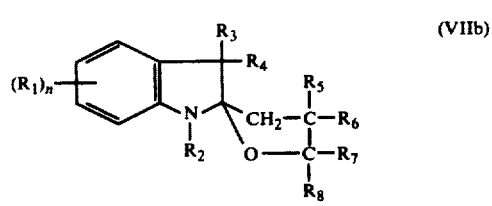

depending on the substituents.

Compounds of the formulae (VIIa) and (VIIb) are prepared by reacting 2-methyleneindolines of the formula

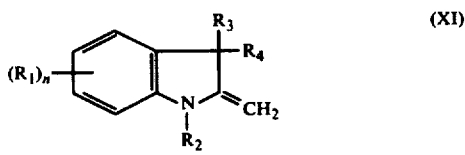

wherein $R_1$ to $R_4$ and $n$ have the abovementioned meaning, with oxiranes of the formula

or alcohols of the formula

wherein

Z is a leaving group, especially a hydroxyl, mercapto, halogen, $C_1$-$C_4$-alkoxy, $C_1$-$C_4$-alkylmercapto, formyloxy or acetoxy group, a carbonic acid group esterified by methanol or ethanol, a sulphuric acid group or phosphoric acid group optionally esterified by methanol or ethanol, a $C_1$-$C_4$-alkylsulphonic acid group or a benzenesulphonic acid group which is optionally substituted by $C_1$-$C_4$-alkyl and $R_5$ to $R_8$ possess the above meaning.

The reaction can be carried out without a solvent or in the presence of an organic solvent at, preferably, 80°–250° C. Examples of suitable solvents are toluene, xylene, chlorobenzene, dichlorobenzene, tetrahydrofurane or dioxane.

Compounds of the formula (VII) in which X differs from hydroxyl are obtained from the compounds (VIIa) or (VIIb) by reaction with acids, acid halides, acid anhydrides or acid esters, such as sulphuric acid, phosphoric, hydrochloric acid, chlorosulphonic acid, phosphorus oxychloride, phosphorus oxybromide, thionly chloride, dimethyl sulphate, acetyl chloride or acetic anhydride.

The reaction can be carried out, for example, at 20°–100° C. The acid or the acid derivative can at the same time serve as the solvent, or a further solvent, such as benzene, toluene, xylene, chlorobenzene, dichlorobenzene, ethylene chloride or chloroform, can be added.

The new dyestuffs are suitable for dyeing from an aqueous liquor or from organic solvents and for printing filaments, tapes, woven fabrics or knitted fabrics made of polyacrylonitrile or of copolymers of acrylonitrile with other vinyl compounds, such as vinyl chloride, vinylidene chloride, vinyl fluoride, vinyl acetate, vinylpyridine, vinylimidazole and vinyl alcohol, acrylic acid esters and amides and methacrylic acid esters and amides and as. dicyanoethylene, or flocks, fibres, filaments, tapes, woven fabrics and knitted fabrics made of acid-modified aromatic polyesters as well as acid-modified polyamide fibres. Acid-modified aromatic polyesters are, for example, polycondensation products of sulphoterephthalic acid and ethylene glycol, that is to say polyethylene glycol terephthalates containing sulphonic acid groups, such as are described in Belgain patent specification No. 549,179 and in U.S. Pat. No. 2,893,816. Acid-modified polyamides are described, for example, in U.S. Pat. Nos. 3,039,990 and 3,454,351.

As in the case of the cationic dyestuffs, dyeing can customarily advantageously be carried out from a neutral or acid aqueous liquor at 40°–100° C. or under pressure at above 100° C. It can be effected with the addition of the customary auxiliaries, for example in the presence of retarders, such as dodecyldimethyl-benzyl-ammonium chloride, or of nonionic auxiliaries, such as stearyl alcohol with 50 mols of ethylene oxide, or dyeing accelerators, such as benzyloxypropionitrile.

When the dyestuffs are using for printing the indicated polymers, customary auxiliaries, such as wetting agents and thickners, are added to the printing inks.

The dyestuffs can furthermore be added to spinning solutions for the preparation of fibres containing polyacrylonitrile or can be applied to the unstretched fibres.

The dyeings on material containing acrylonitrile are distinguished by a good fastness to light, wet processing, rubbing and sublimation and by a good migration capacity.

The dyestuffs possess very good solubility in water, so that it is possible to prepare concentrated solutions of these dyestuffs without the addition of organic solvents. A further advantage is the insensitivity to foreign ions which can give rise to troublesome precipitates, for example to thiocyanate ions which, in industrially important dyeing processes, are frequently entrained in the dyebath due to the process.

Examples of suitable compounds (XI) are: 1,3,3-trimethyl-2-methylene-2,3-dihydroindole, 1,3,3,5-tetramethyl-2-methylene-2,3-dihydroindole, 1,3,3-trimethyl-5-chloro-2-methylene-2,3-dihydroindole, 1,3,3-trimethyl-5-methoxy-2-methylene-2,3-dihydroindole, 1,3,3-trimethyl-5-carbomethoxy-2-methylene-2,3-dihydroindole, 1,3,3-trimethyl-5-carboethoxy-2-methylene-2,3-dihydroindole, 1,3,3-trimethyl-5-cyclohexyl-2-methylene-2,3-dihydroindole, 1,3,3-trimethyl-5-benzyl-2-methylene-2,3-dihydroindole, 1,3,3-trimethyl-7-methyl-2-methylene-2,3-dihydroindole, 1,3,3-trimethyl-5-trifluoromethyl-2-methylene-2,3-dihydroindole, 1,3,3-trimethyl-7-methoxy-2-methylene-2,3-dihydroindole, 1,3,3-trimethyl-7-chloro-2-methylene-2,3-dihydroindole, 1-ethyl-3,3-dimethyl-2-methylene-2,3-dihydroindole, 1-ethyl-3,3,5-trimethyl-2-methylene-2,3-dihydroindole, 1-ethyl-3,3-dimethyl-5-chloro-2-methylene-2,3-dihydroindole, 1-ethyl-3,3-dimethyl-5-methoxy-2-methylene-2,3-dihydroindole, 1-ethyl-3,3-dimethyl-5-carbomethoxy-2-methylene-2,3-dihydroindole, 1-ethyl-3,3-dimethyl-5-carboethoxy-2-methylene-2,3-dihydroindole, 1-ethyl-3,3,7-trimethyl-5-cyclohexyl-2-methylene-2,3-dihydroindole, 1-ethyl-3,3-dimethyl-5-benzyl-2-methylene-2,3-dihydroindole, 1-benzyl-3,3-dimethyl-2-methylene-2,3-dihydroindole, 1-phenyl-3,3-dimethyl-2-methylene-2,3-dihydroindole, 1,3,3-trimethyl-4-benzyl-2-methylene-2,3-dihydroindole, 1,3,3-trimethyl-6-benzyl-2-methylene-2,3-dihydroindole, 1,3,3-trimethyl-7-benzyl-2-methylene-2,3-dihydroindole, 1,3,3-trimethyl-5-fluoro-2-methylene-2,3-dihydroindole, 1,3,3-trimethyl-5-ethoxy-2-methylene-2,3-dihydroindole, 1,3,3-trimethyl-7-ethoxy-2-methylene-2,3-dihydroindole, 1,3,3-trimethyl-5-cyano-2-methylene-2,3-dihydroindole, 1,3,3-trimethyl-5-acetylamino-2-methylene-2,3-dihydroindole, 1,3,3-trimethyl-5-methylsulphonyl-2-methylene-2,3-dihydroindole, 1,3,3-trimethyl-5-phenylsulphonyl-2-methylene-2,3-dihydroindole, 1,3,3-trimethyl-5-sulphonamido-2-methylene-2,3-dihydroindole, 1,3,3-trimethyl-5-carboxyamido-2-methylene-2,3-dihydroindole, 1,3,3-trimethyl-5-(carboxylic acid ethylanilide)-2-methylene-2,3-dihydroindole, 1,3,3-trimethyl-7-ethyl-2-methylene-2,3-dihydroindole, 1,3,3-trimethyl-5-chloro-7-methoxy-2-methylene-2,3-dihydroindole, 1,3,3-trimethyl-4-chloro-7-methoxy-2-methylene-2,3-dihydroindole, 1,3,3-trimethyl-4,6-dicarbomethoxy-2-methylene-2,3-dihydroindole, 1,3,3-trimethyl-4,5-dichloro-7-methoxy-2-methylene-2,3-dihydroindole, 1,3,3-trimethyl-5-chloro-4,7-dimethoxy-2-methylene-2,3-dihydroindole, 1,3,3,4,5,7-hexamethyl-2-methylene-2,3-dihydroindole, 1,3,3,4,6,7-hexamethyl-2-methylene-2,3-dihydroindole, 1-cyanoethyl-3,3-dimethyl-2-methylene-2,3-dihydroindole, 1-carboxamido-ethyl-3,3-dimethyl-2-methylene-2,3-dihydroindole, 1-allyl-3,3-dimethyl-2-methylene-2,3-dihydroindole, 1-phenethyl-3,3-dimethyl-2-methylene-2,3-dihydroindole or 1-chloroethyl-3,3-dimethyl-2-methylene-2,3-dihydroindole.

Examples of oxiranes of the formula XII which are suitable according to the invention are: ethylene oxide, propylene oxide, butylene 1,2-oxide, butylene 2,3-oxide, 1-chloro-2,3-epoxypropane, 1-methoxy-2,3-epoxypropane, 1-ethoxy-2,3-epoxypropane, 1-n-propoxy-2,3-epoxypropane, 1-isopropoxy-epoxypropane, 1-n-butoxy-2,3-epoxypropane, 1-isobutoxy-2,3-epoxypropane, 1-tert.-butoxy-2,3-epoxypropane, 1-n-pentoxy-2,3-epoxypropane, 1-isopentoxy-2,3-epoxypropane, 1-n-hexoxy-2,3-epoxypropane, 1-(2'-ethyl-n-hexoxy)-2,3-epoxypropane, 1-n-octyloxy-2,3-epoxypropane, 1-n-nonyloxy-2,3-epoxypropane, 1-n-decyloxy-b 2,3-epoxypropane, 1-n-undecyloxy-2,3-epoxypropane, 1-n-dodecyloxy-2,3-epoxypropane, 1-n-hexadecyloxy-2,3-epoxypropane, 1-n-octadecyl-2,3-epoxypropane, 1-dimethylamino-2,3-epoxypropane, 1-dimethylamino-2,3-epoxypropane, 1-di-n-butylamino-2,3-epoxypropane, 1-phenoxy-2,3-epoxypropane, 1-(p-nitrophenoxy)-2,3-epoxypropane, 1-(p-methylphenoxy)-2,3-epoxypropane, 1-(m-methylphenoxy)-2,3-epoxypropane, 1-(o-methylphenoxy)-2,3-epoxypropane, 1-(nonylphenoxy)-2,3-epoxypropane, 1-(dodecylphenoxy)-2,3-epoxypropane, styrene oxide, allyloxy-2,3-epoxy-propane, propargyloxy-2,3-epoxypropane, 2,3-epoxypropan-1-ol, 1,2-epoxydecane, 1,2-epoxy-3-(4-methylphenyl-mercapto)-propane, benzoic acid 2,3-epoxypropyl ester, N-(2,3-epoxypropyl)-pyrrolidine, 3-(diallylamino)-1,2-epoxypropane, 3,3,3-trichloro-1,2-epoxypropane, 3,3,3-trifluoro-1,2-epoxypropane, 3,4-epoxybut-1-ene, 1,2-epoxy-3-(4-methylphenyl)-propane and 1,2-epoxy-3-(4-methoxyphenyl)-propane and cyclohexene oxide.

The parts indicated in the examples which follow are parts by weight.

EXAMPLE 1

21.1 parts of 4-methoxy-ethoxy-ethoxy-aniline were dissolved in 150 parts by volume of water and 22 parts by volume of concentrated hydrochloric acid and diazotised at 0°–5° C. with a solution of 7.3 parts of sodium nitrite in 25 parts by volume of water. After 10 minutes 2 parts of amido-sulphonic acid were added and the solution was added to a solution of 23.8 parts of 1,3,3-trimethyl-2-(3-chloropropylidene-1)-indoline (see example D) in 50 parts of alcohol at room temperature. The mixture was stirred for a further 10 minutes and the dyestuff was precipitated with 250 parts of a concentrated solution of sodium acetate and 100 parts of a concentrated solution of sodium chloride. The dyestuff separates out as a viscous oil. It has the formula

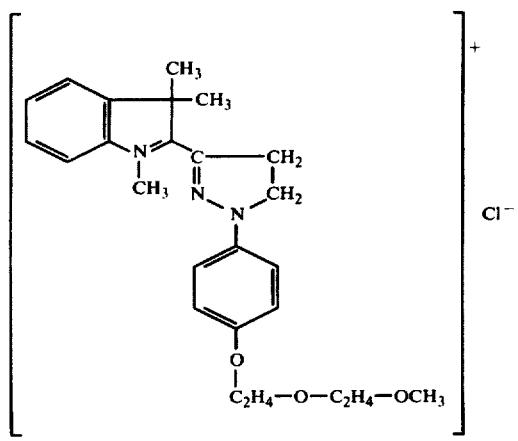

and dyes polyacrylonitrile fibres in red shades with very good fastness properties.

The following dyestuffs were prepared according to Example 1 and the diazotisation of the amines was carried in accordance with the methods customary in azo chemistry.

Table I contains components which can be reacted according to Example 1 to give the corresponding dyestuffs. The colour shade in polyacrylonitrile fibres is indicated in Tables I and II.

Table I

| Indoline | Diazo component | Colour shade |
|---|---|---|
| 1,3,3-trimethyl-2-(3-chloropropylidene)-indoline | 4-(ethoxy-ethoxy-ethoxy)-aniline | red |
| 5-methoxy-1,3,3-trimethyl-2-(3-chloro-2-methylpropylidene)-indoline | 4-(methoxy-ethoxy-ethoxy)-aniline | red |
| 1,3,3-trimethyl-2-(3-sulphatobutylidene)-indoline | 4-[(ethoxy-ethoxy-ethoxy)-carbonyl]-aniline | orange |
| 5-chloro-1,3,3-trimethyl-2-(3-chloropropylidene)-indoline | " | scarlet |
| 5-nitro-1,3,3-trimethyl-2-(3-chloropropylidene)-indoline | " | red |

Table I-continued

| Indoline | Diazo component | Colour shade |
|---|---|---|
| [indoline structure: 1,3,3-trimethyl-2-(3-chloropropylidene)indoline] | 4-amino-phenyl-O—C₂H₄—O—C₂H₄—O—COCH₃ | red |
| " | 4-amino-phenyl-O—C₂H₄—O—C₂H₄—OH | red |
| " | 3-amino-phenyl-O—C₂H₄—O—C₂H₄—OH | red |
| " | 3-amino-phenyl-O—C₂H₄—O—C₂H₄—OCH₃ | red |
| " | 3-amino-phenyl-O—C₂H₄—O—C₂H₄—COO—C₂H₄—OCH₃ | red |
| " | 3-amino-phenyl-COOC₂H₄—O—C₂H₄—O—CH₃ | orange |
| " | 2-amino-4-(O—C₂H₄—O—C₂H₄—O—CH₂—CH=CH₂)-1-chlorobenzene | scarlet |
| " | 4-amino-phenyl-O—C₂H₄—O—CO—C₂H₄—O—C₂H₄—O—CH₃ | red |
| " | 4-amino-phenyl-O—C₂H₄—O—CO—CH₂—O—C₂H₄—O—CH₃ | red |
| " | 4-amino-phenyl-O—C₂H₄—O—C₃H₆—O—CH₃ | red |

Table I-continued

| Indoline | Diazo component | Colour shade |
|---|---|---|
| " | NH$_2$–C$_6$H$_4$–O–C$_2$H$_4$–O–C$_4$H$_8$–O–CH$_3$ (para) | red |
| " | NH$_2$–C$_6$H$_4$–O–C$_2$H$_4$–O–C$_2$H$_4$–O–C$_6$H$_5$ (para) | red |
| " | NH$_2$–C$_6$H$_4$–O–C$_2$H$_4$–O–C$_2$H$_4$–O–COC$_2$H$_4$–COOCH$_3$ (meta) | scarlet |
| 3,3-dimethyl-1-(2-hydroxyethyl)-2-(3-chloropropylidene)indoline | NH$_2$–C$_6$H$_4$–O–C$_2$H$_4$–OH (ortho) | orange |
| 3,3-dimethyl-1-benzyl-2-(3-chloropropylidene)indoline | NH$_2$–C$_6$H$_4$–O–C$_2$H$_4$–O–CH$_3$ (para) | red |

EXAMPLE 2

44 parts of 1,3,3-trimethyl-indoline-2-spirohydrofurane or 1,3,3-trimethyl-2-(3-oxypropylidene-1)-indoline (see Example A) are added dropwise to 35 parts of phosphorus oxychloride at 60°–70° C., whilst stirring well. The mixture was stirred for 2 hours at 80° C. and the batch was introduced into 250 parts of ice water and stirred for a further 1 hour at 20°–25° C. A diazonium salt solution of 22.6 parts of 4-amino-benzoic acid methoxy-ethoxy-ethyl ester, 60 parts of glacial acetic acid, 40 parts of 10% strength hydrochloric acid, 14 parts of sodium nitrite and 40 parts of water was added to this solution and the dyestuff was precipitated as a viscous oil with 150 parts of a concentrated solution of sodium acetate and 200 parts of a concentrated solution of sodium chloride.

The dyestuff has the formula

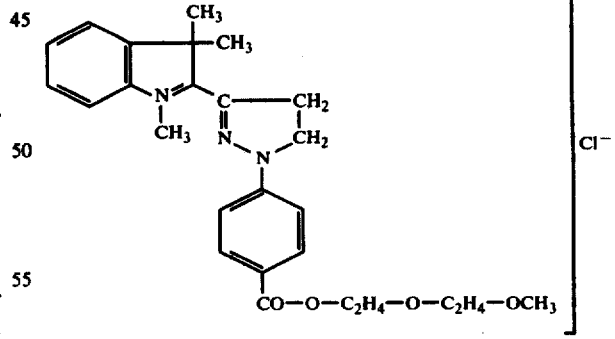

and dyes polyacrylonitrile fibres in orange shades with excellent fastness properties.

The following components were reacted according to Example 2:

Table II

| Indoline | | Diazo component | Colour shade |
|---|---|---|---|
| [indoline structure: 3,3-dimethyl-1-methyl-2-(2-hydroxypropylidene)methyl indoline] or | [indoline structure: 3,3-dimethyl-1-methyl-2-(CH2-CH2-O-CH(CH3)) indoline] | 4-amino-phenyl-O-C2H4-O-C2H4-O-C4H9 | red |
| [3,3-dimethyl-1-methyl-2-(hydroxypropylidenemethyl) indoline] | | 4-amino-phenyl-COO-C2H4-O-C2H4-O-C4H9 | orange |
| [5-chloro-3,3-dimethyl-1-methyl-2-(hydroxypropylidenemethyl) indoline] or | [5-chloro-3,3-dimethyl-1-methyl-2-(CH2-CH2-O-CH(CH3)) indoline] | 4-amino-phenyl-COO-C2H4-O-C2H4-O-C4H9 | scarlet |
| " | | 4-amino-phenyl-O-C2H4-O-C2H4-OCH3 | red |
| [CH3OOC-substituted 3,3-dimethyl-1-methyl-2-(hydroxypropylidenemethyl) indoline] or | [CH3OOC-substituted 3,3-dimethyl-1-methyl-2-(CH2-CH2-O-CH2) indoline] | 4-amino-phenyl-COO-C2H4-O-C2H4-OCH3 | scarlet |

EXAMPLE 3

Using a liquor ratio of 1:40, polyacrylonitrile fibres are introduced, at 40° C., into an aqueous bath which contains, per liter, 0.75 part of 30% strength acetic acid, 0.38 part of sodium acetate and 0.15 part of the dyestuff described in Example 2. The bath is heated to the boil in the course of 20 to 30 minutes and is kept at this temperature for 30 to 60 minutes. After rinsing and drying, a brilliant orange dyeing which is distinguished by very good fastness properties is obtained.

EXAMPLE 4

Using a liquor ratio of 1:40, acid-modified polyethylene glycol terephthalate fibres are introduced, at 20° C., into an aqueous bath which contains, per liter, 3 to 10 parts of sodium sulphate, 0 to 15 parts of dimethylbezyldodecylammonium chloride and 0.15 part of the dyestuff described in Example 1/5 and the pH of which has been adjusted to 4-5 with acetic acid. The bath is heated to 100° C. in the course of 30 minutes and is kept at this temperature for 60 minutes. The fibres are then rinsed and dried. A brilliant scarlet dyeing with very good fastness properties is obtained.

EXAMPLE 5

0.055 part of the dyestuff described in Example 1 is mixed to a paste, in a 500 ml dye beaker which is in a heated water bath, with 20 times the amount of hot water, with the addition of a little acetic acid, and dissolved with hot water. The dye liquor is made up to 500 ml with cold water. The pH value of the dye liquor is adjusted to 4.5-5 with acetic acid or sodium acetate. 10 parts of piece goods of acid-modified polyamide are introduced, at room temperature, into the dye liquor prepared in this way. The dyebath is warmed to 100° C. in the course of 15 minutes, whilst continuously agitating the goods to be dyed. Dyeing is then carried out at the boiling point for 15 to 20 minutes. The piece goods are then rinsed with cold water and finally dried. A red dyeing is obtained.

EXAMPLE A 173 parts of 1,3,3-trimethyl-2-methylene-indoline and 50 parts of glacial acetic acid were heated under nitrogen to 140°–150° C. in an autoclave. Ethylene oxide was passed in, whilst stirring, until saturation was reached (about 88 parts in 4 hours). The mixture was stirred for a further 2 hours, the autoclave was flushed with nitrogen and the product was distilled in vacuo. The compound boils at 125°–128° C.; 0.8 mm Hg and has the formula

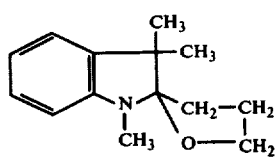

A₁

202 parts of 1,3,3-trimethyl-2-methylene-5-methoxy-indoline can be employed in place of 1,3,3-trimethyl-2-methylene-indoline. A compound which has a boiling point of 152°–156° C.; 0.1 mm Hg and the formula

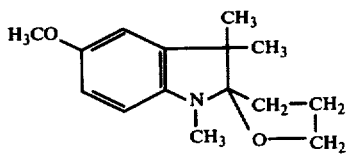

A₂ is obtained.

EXAMPLE B 173 parts of 1,3,3-trimethyl-2-methylene-indoline, 17 parts of glacial acetic acid and 116 parts of propylene oxide were heated to 200° C. for 5 hours in an autoclave, whilst stirring. The product was distilled in vacuo. The compound boils at 128°–130° C.; 0.6 mm Hg and has the formula

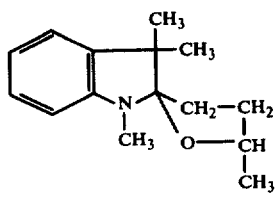

B₁

When 207 parts of 1,3,3-trimethyl-2-methylene-5-chloroindoline are employed in place of 1,3,3-trimethyl-2-methyleneindoline, a compound which has a boiling point of 135°–138° C at 1.5 mm Hg and has the formula

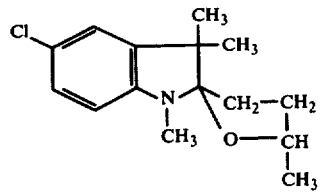

B₂ is obtained.

EXAMPLE C 434 parts of the compound of the formula A were dissolved in 3,000 parts of ethylene chloride. 240 parts of chlorosulphonic acid were added dropwise at 0°–5° C. The mixture was stirred for a further 5 hours at room temperature and the product was filtered off, rinsed with 1,000 parts of ethylene chloride and dried in vacuo. The compound melts at 215°–217° C. and has the formula

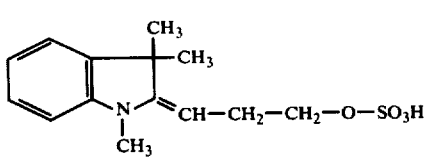

C₁

If, in this batch, the compound of the formula C is used in place of the compound of the formula A, the compound which has a melting point of 185°–187° C. and has the formula

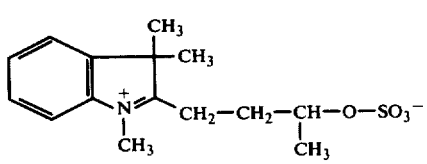

C₂ is obtained.

EXAMPLE D 250 parts of the compound of the formula A₁ were added dropwise to 335 parts of phosphorus oxychloride at 70° C., whilst stirring. The mixture was stirred for a further 3 hours at 70° C., the batch was poured onto 3,500 parts of ice and the pH was adjusted to 5 with 740 parts of sodium hydroxide solution (45% strength). The batch was extracted by shaking with 2,500 parts of toluene, the toluene was separated off and the product was washed with 2,000 parts of water and distilled in vacuo under nitrogen. A compound which has a boiling point of 149°–152° C., 0.8 mm Hg and has the formula

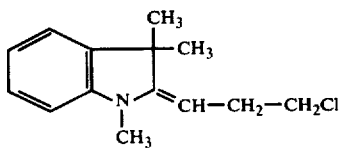

D is obtained.

5. Methine dyestuff of claim 1 of the formula
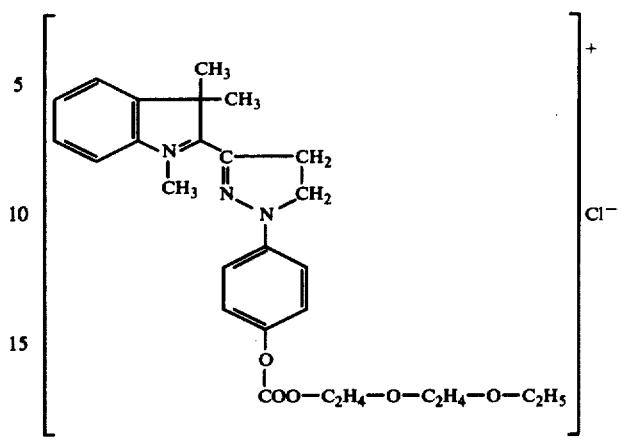

We claim:
1. Methine dyestuff of the formula

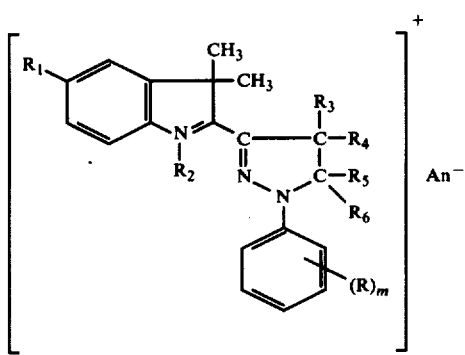

wherein
- R is chlorine, bromine, nitro, cyano, $C_1$-$C_4$-alkyl, $C_1$-$C_4$-alkoxy, $C_1$-$C_4$-alkoxycarbonyl, $C_1$-$C_4$-alkylsulphonyl, phenylsulphonyl, aminocarbonyl, or aminosulphonyl;
- $R_1$ is hydrogen, $C_1$-$C_4$-alkyl, trifluoromethyl, chlorine, bromine, nitro, cyano, $C_1$-$C_4$-alkoxy, $C_1$-$C_4$-alkoxycarbonyl, methylcarbonylamino, ethylcarbonylamino, phenylcarbonylamino, aminocarbonyl, aminosulphonyl, $C_1$-$C_4$-alkylsulphonyl, or phenylsulphonyl;
- $R_2$ is phenyl, benzyl, $C_1$-$C_4$-alkyl, or $C_1$-$C_4$-alkyl substituted by hydroxyl, chlorine, cyano, or aminocarbonyl;
- $R_3$ and $R_4$ are hydrogen or $C_1$-$C_4$-alkyl;
- $R_5$ and $R_6$ are hydrogen, $C_1$-$C_4$-alkyl or phenyl;
- m is o, 1, 2 or 3;
- $An^-$ is an anion; and
- additionally at least one radical R must be a substituent of the formulae $$-O-(B_1-O)_{p_1}-E_1;$$
$$-O-CO-F_1-O-(B_1-O)_{p_1}-E_1; \text{ or}$$
$$-(O-F_1)_{q_1}-CO-O-(B_1-O)_{p_1}-E_1$$

wherein
- $B_1$ is $C_2$-$C_4$-alkylene;
- $E_1$ is hydrogen, $C_1$-$C_4$-alkyl, $C_2$-$C_4$-alkenyl, halo-$C_1$-$C_4$-alkyl, halo-$C_2$-$C_4$-alkenyl, cyano-$C_1$-$C_4$-alkyl, cyano-$C_2$-$C_4$-alkenyl, formyl, phenylcarbonyl, phenyl-$C_1$-$C_6$-alkylcarbonyl, phenoxy-$C_1$-$C_6$-alkylcarbonyl, phenyl-$C_1$-$C_6$-alkyl, $C_1$-$C_4$-alkylcarbonyl, halo-$C_1$-$C_4$-alkylcarbonyl, cyano-$C_1$-$C_4$-alkylcarbonyl $C_1$-$C_4$-alkoxy-$C_1$-$C_4$-alkylcarbonyl, $C_2$-$C_4$-alkenylcarbonyl, halo-$C_1$-$C_4$-alkenylcarbonyl, cyano-$C_2$-$C_4$-alkenylcarbonyl, or $C_1$-$C_4$-alkoxy-$C_2$-$C_4$-alkenylcarbonyl;
- $F_1$ is $C_1$- or $C_2$-alkylene;
- $p_1$ is 2 or 3; and
- $q_1$ is 0 or 1.

2. Methine dyestuff of the formula

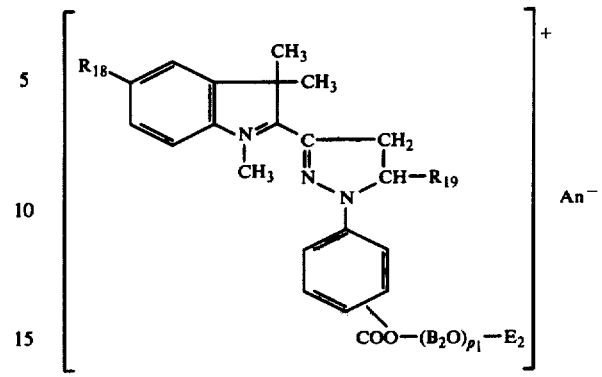

wherein
- $R_{18}$ denotes hydrogen, methyl, nitro, cyano, methoxy, ethoxy, methoxycarbonyl or ethoxycarbonyl or acetylamino,
- $R_{19}$ denotes hydrogen, methyl or ethyl,
- $B_2$ denotes ethylene,
- $E_2$ denotes methyl or ethyl,
- $p_1$ denotes 2 or 3 and
- $An^-$ denotes an anion.

3. Methine dyestuff of claim 1 of the formula

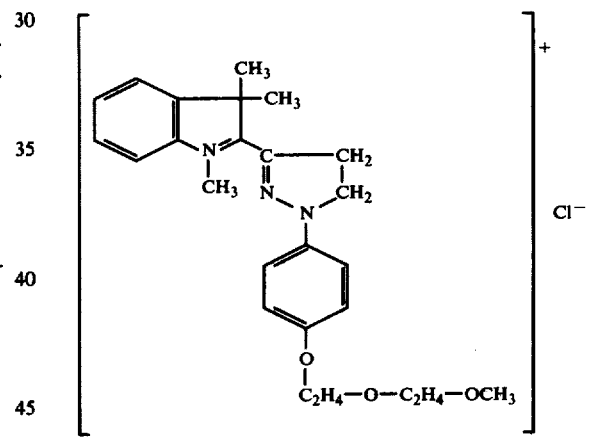

4. Methine dyestuff of claim 1 of the formula

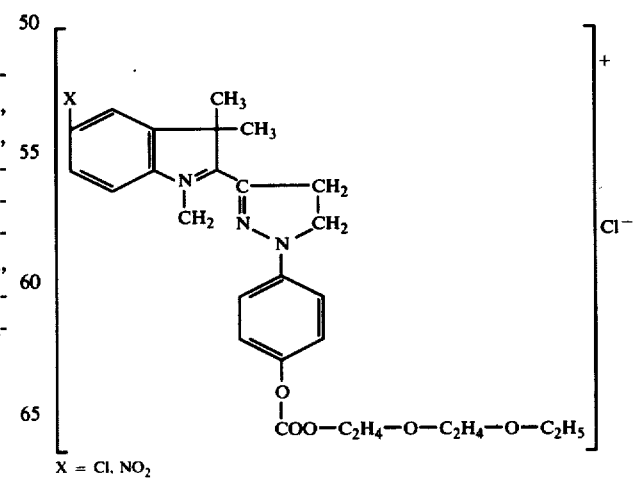

X = Cl, $NO_2$